Sept. 18, 1951 G. HOHWART ET AL 2,568,585
DIAPHRAGM CHUCK (UNIVERSAL GEAR TYPE)
Filed Sept. 20, 1946 2 Sheets-Sheet 1

INVENTORS.
George Hohwart,
Ernest F. Hohwart.
BY
Harness, Dickey & Pierce
ATTORNEYS.

Sept. 18, 1951 G. HOHWART ET AL 2,568,585
DIAPHRAGM CHUCK (UNIVERSAL GEAR TYPE)
Filed Sept. 20, 1946 2 Sheets-Sheet 2
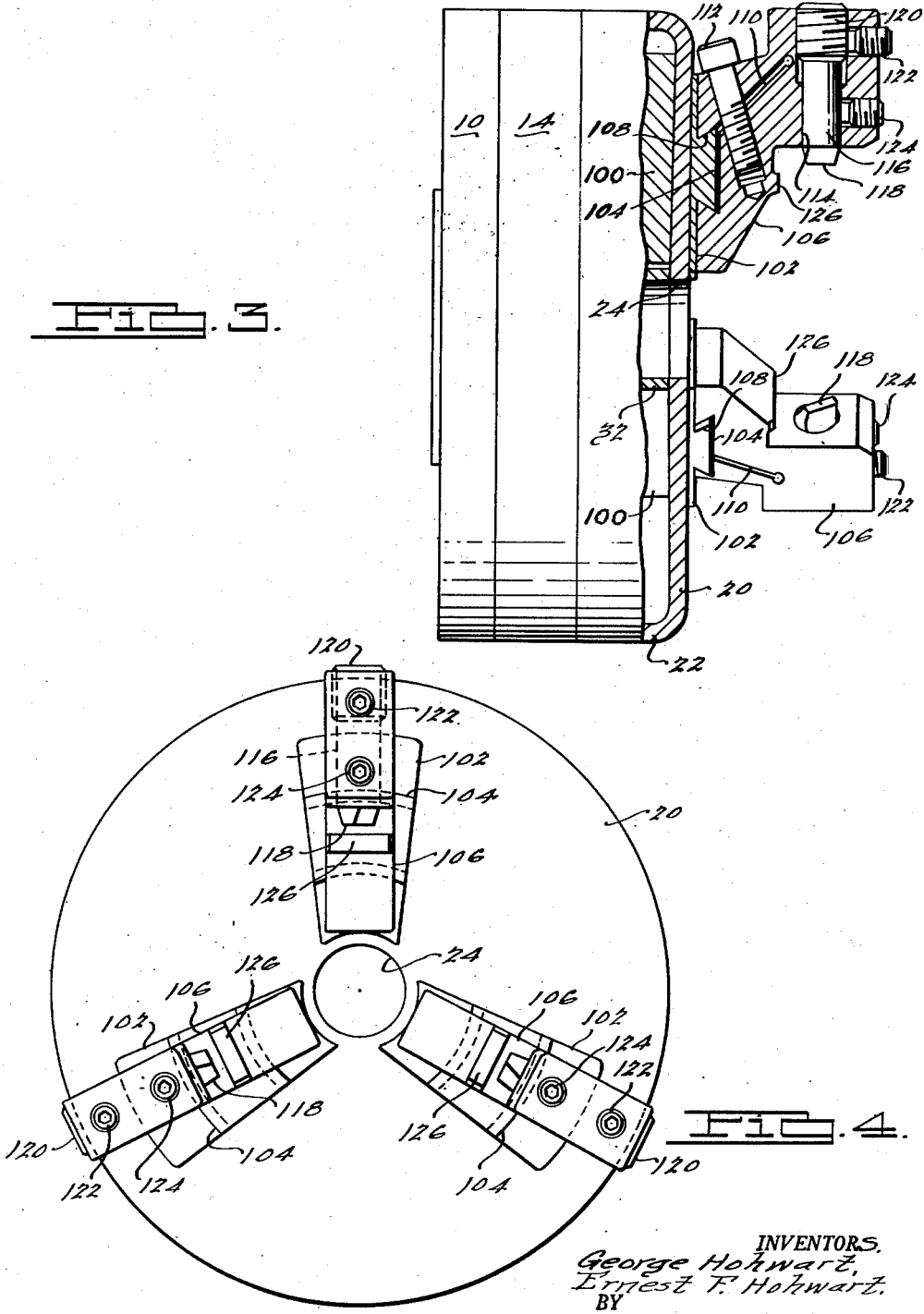
INVENTORS.
George Hohwart,
Ernest F. Hohwart,
BY
ATTORNEYS.

Patented Sept. 18, 1951

2,568,585

UNITED STATES PATENT OFFICE 2,568,585

DIAPHRAGM CHUCK (UNIVERSAL GEAR TYPE)

George Hohwart and Ernest F. Hohwart, Detroit, Mich., assignors to N. A. Woodworth Company, Ferndale, Mich., a corporation of Michigan Application September 20, 1946, Serial No. 698,208

11 Claims. (Cl. 279—46)

This invention relates to diaphragm chucks and has for its principal object the provision of a new and novel form of jaw mechanism therefor.

Objects of the invention include the provision of a diaphragm chuck particularly adapted for chucking gears through engagement with the teeth thereof and which chuck may be adjusted to chuck gears having widely different numbers of teeth thereon; the provision of a diaphragm chuck including a jaw mechanism comprising a plurality of identical or similar jaw assemblies each including a jaw member that may be shifted circumferentially of the axis of the chuck; the provision of a diaphragm chuck having a plurality of jaw assemblies secured to the axially outer face thereof and each including a tooth-engaging element and a support therefor shiftable circumferentially of the chuck with respect to its neighbors; and the provision of a chuck of the type described that is simple in construction, economical of manufacture and efficient in use.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Fig. 1 is a partially broken, partially sectioned side elevational view of a diaphragm chuck provided with a jaw mechanism constructed in accordance with the present invention, the section being taken through the axis of the chuck;

Figs. 3 and 4 are views corresponding to Figs. 1 and 2, respectively, showing a modified form of construction.

Figure 1:
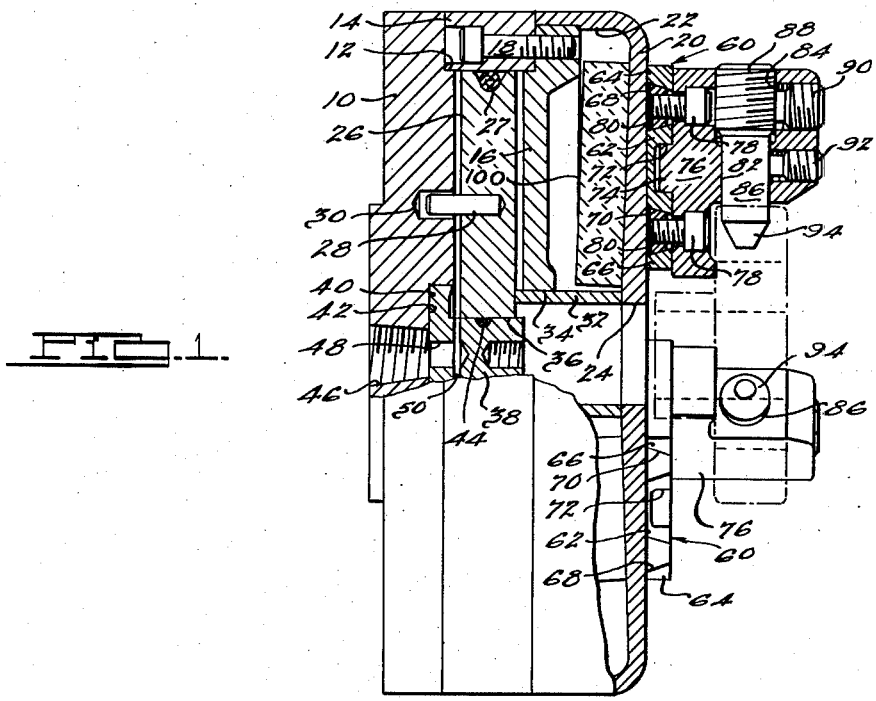

The present invention deals with diaphragm chucks primarily adapted for chucking gears through the teeth thereof for some operation on the gear as, for instance, finishing the bore thereof in the case of spur gears. While the chuck may be adapted for chucking either external or internal gears and either straight spur gears, helical gears, herringbone gears or the like, for the purpose of illustration the embodiment shown in the accompanying drawing is shown as being adapted to chuck straight spur gears. The gist of the present invention resides in the ability of the gear tooth engaging members of the chuck to be shifted circumferentially of the chuck about the axis thereof so as to enable the gear-engaging elements to be adapted to properly engage the gear teeth regardless of the number or angle of teeth thereon. While the gear-engaging elements may be of the type which engage between adjacent pairs of gear teeth, or of the type which engage over the outside of a single gear tooth, the former is shown in the drawing by way of preference.

It will be understood that the present invention is applicable to diaphragm chucks regardless of the specific construction of the same and whether they are either manually, mechanically or fluid pressure operated, the latter type of chuck being shown in the drawing by way of illustration.

Referring now to the accompanying drawing, the diaphragm chuck there shown by way of illustration comprises a disk-like mounting plate 10 adapted to be concentrically mounted upon the end of the spindle of a lathe, screw machine, grinder or the like in fixed relation with respect thereto. The forward face of the mounting plate or member 10 has its outer margin peripherally stepped, as indicated at 12, for receiving and piloting thereon a ring member 14 which may be suitably secured thereto in any desired or conventional manner. A more or less disk-like backing member 16 is received against the forward face of the ring member 14 in piloted relation with respect thereto and is secured thereto by means of a plurality of circumferentially spaced screws 18. A diaphragm 20 of more or less cup-shaped conformation has an axially turned marginal portion 22 which is received upon the periphery of the backing plate 16 and is suitably fixed thereto. The diaphragm 20 is, of course, concentric with the axis of rotation of the chuck and preferably is provided with a central opening 24.

A piston 26 is axially slidably received in the ring member 14 between the mounting member 10 and the backing plate 16 and its periphery is sealed to the bore of the ring member 14 by means of an O-ring seal 27. A rearwardly projecting axially parallel pin 28 eccentric to the axis of the piston 26 is fixed thereto and is slidably received in a complementary opening 30 in the forward face of the mounting plate 10 in order to hold the piston 26 against rotation relative to the ring member 14. A sleeve member 32 concentric with the axis of the chuck is positioned between the diaphragm 20 and the piston 26 to transmit thrust from the latter to the former. The piston 26 is provided with a central opening 36 in which is closely but slidably received a plug member 38 concentric therewith and carried by a mounting disk 40 fixed in a central recess 42 in the forward face of the mounting plate 10. An O-ring seal 44 seals the joint between the plug 38 and the piston 26 against leakage.

The mounting plate 10 is provided with a central threaded opening 46 which communicates with a central opening 48 in the plug 38 and which in turn communicates with radial openings 50 in the plug 38 which lead to the space between the rear face of the piston 26 and the forward face of the mounting member 10. Accordingly, in the construction shown, the application of fluid pressure to the opening 46 is effective to apply fluid pressure to the rear face of piston 26 and the force thus supplied thereto is transmitted through the sleeve member 32 to the center of the diaphragm 20 to spring it axially outwardly. It will be appreciated that if the chuck is adapted to chuck ring gears, then the diaphragm 20 will necessarily be required to be sprung in the opposite direction to move the jaws toward an inoperative position, and in such case the construction described will be modified to apply the fluid pressure between the rear face of the backing plate 16 and the forward face of the piston 26, and to transmit a pull between the diaphragm and the piston.

The above described features form no part of the present invention. They are shown and described merely by way of illustration of a suitable diaphragm chuck to which the present invention may be applied. For instance, the use of the cup-shaped diaphragm is disclosed in United States Patent No. 2,403,599 issued July 9, 1946. The particular mechanism employed for operating the chuck by fluid pressure forms the subject matter of our copending application for Letters Patent of the United States for Improvements in Diaphragm Chuck filed July 13, 1946, and serially numbered 683,458, now Patent Number 2,491,611, issued December 20, 1949.

Three or more jaw assemblies constructed in accordance with the present invention may be employed, three being preferred and being shown by way of illustration. In the construction shown in Figs. 1 and 2 each jaw assembly comprises a jaw base or base assembly 60 suitably secured in fixed relation with respect to the outer face of the diaphragm 20. The jaw bases 60 are identical to one another and equally angularly spaced from each other about the axis of diaphragm 20 and each is positioned at identically the same distance radially from the axis of the chuck. Each jaw base 60 comprises a central portion 62, a radially outer portion 64 and a radially inner portion 66, the opposed radial faces of which are concentric with the axis of the chuck and are axially oppositely tapered so as to provide a dovetail groove 68 between the central portion 62 and the radially outer portion 64, and a dovetail groove 70 between central portion 62 and the radially inner portion 66. The central portion 62 on its axially outer face is centrally provided with a square sided groove 72 concentric with the axis of the chuck.

The last mentioned groove 72 is adapted for complementary reception of a rib 74 formed on the axially inner face of a jaw member 76, one of which is received by each jaw base 60, such jaw member 76 therefore being guided on the corresponding jaw base 60 for movement circumferentially of the axis of the chuck. Each jaw member 76 is releasably fixed to its jaw base 60 in circumferentially adjusted position by means of clamping screws 78 which are projected rearwardly through the jaw member 76 in parallel relation with respect to the axis of the chuck and are threaded at their rear ends into wedge members 80 slidably received in the corresponding dovetail grooves 68 and 70.

While the jaw members 76 may vary considerably in form and construction, and may be formed for direct reception of the work in the broader aspects of the invention, in the particular construction shown in the drawing by way of illustration, each jaw member 76 comprises a single block of metal which is provided axially outwardly of the clamping screws 78 with a radial opening 82 the radially outer end of which is counterbored as at 84. Each opening 82 closely but slidably and rotatably receives a pin 86, and a back-up screw 88 is threadably received in the counterbored portion 84 of each opening 82 in axially abutting relation with respect to the radial outer end of the corresponding pin 86. Each adjusting screw 88 is releasebly locked in axially adjusted position by means of a set screw 90 threaded through the axially outer face of each jaw member 76, and each pin 86 is similarly locked in both radially and axially adjusted position by means of a similarly located set screw 92.

The pins 86 constitute the gear-engaging members in the construction shown, and as previously explained they may be formed to engage between a pair of gear teeth, or in external embracing relationship with respect to the opposite sides of the gear tooth. The former construction is shown by way of illustration. To that end, in the particular construction shown, the radially inner end of each pin 86 is tapered as at 94 so as to adapt it for engagement in the tooth space between a pair of adjacent teeth 96 of a gear such as 98 which is to be received by the chuck. Preferably, the taper of the end 94 of each pin 86 is such that the end 94 will engage the teeth 96 of a gear such as 98 on the pitch line thereof. The tapered ends 94 of the pins 86 may be wedge shaped or frusto-conical, the latter being shown as in such case they are adapted to receive either straight toothed or helical toothed gears without change. If wedge shaped, then the pins 86 must be turned so that the direction of the ends corresponds with the helix angle of the gear teeth when adapted to chuck helical gears.

Preferably a counterweight 100 in the form of a block of metal is secured to the inner face of the diaphragm 20 in axial alignment with each jaw assembly so as to offset the tendency of centrifugal force acting on the jaw assemblies at high rotational speeds to flex the diaphragm in a direction tending to release the grip of the jaws on the work. The counterweights 100 and jaw bases 60 are preferably welded or brazed to the diaphragm 20 and the periphery of the diaphragm is also preferably welded or brazed to the backing plate 16 so as to eliminate any possibility of these parts becoming loosened in service. This feature forms no part of the present invention but does form the subject matter of our copending application for Letters Patent in the United States for Improvements in Diaphragm Chuck, filed July 13, 1946, and serially numbered 683,456, now Patent Number 2,492,640, issued December 27, 1949.

It will be appreciated that in a construction employing members such as the pins 86 engaging the teeth of a gear for clamping it to the chuck, the position of the pins 86 for a gear having one number of teeth will necessarily be different from the position of the pins 86 for engaging a gear having a different number of teeth except where the number of teeth of both gears are divisible by the number of jaw assemblies. For instance, where a chuck such as that shown is employed for chucking a gear having ten teeth, as in the case of the gear 98 shown, and it is desired to chuck a gear having eleven or twelve teeth, the angular relationship of the pins 86 will have to be changed in each case in order to conform to the difference in the number of teeth. With the chuck of the present invention, the clamping screws 78 may be loosened up and the jaw assemblies shifted circumferentially of the chuck until they are in the proper position for chucking a gear regardless of the number of teeth, whereupon the screws 78 may again be tightened up to lock the jaw assemblies in their thus adjusted position. By this means the chuck of the present invention is adaptable for chucking gears having any number of teeth as long as the gears are of such diameter as to be receivable in a chuck of a particular size. This characteristic of the chuck of the present invention eliminates the necessity of engineering and building each chuck for a gear having a specified number of teeth and, therefore, widens the field of usefulness of the chuck to a major extent. At the same time, it will be appreciated that the jaw members 76 may be replaced by other types of jaw members enabling the chuck to be employed for chucking operations on articles other than gears, or for gears of widely different diameters.

Figure 2:
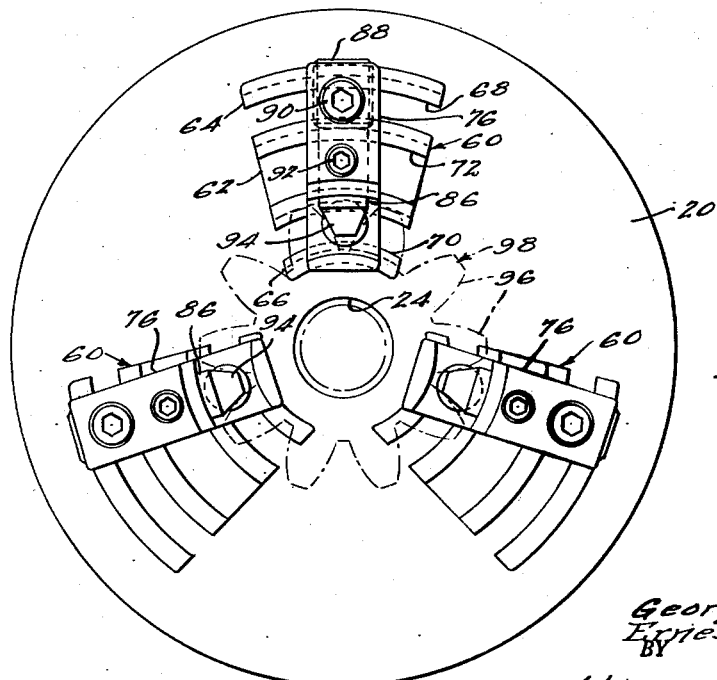
Fig. 2 is a face view of the chuck shown in Fig. 1.

The construction illustrated in Figs. 3 and 4 is identical to that illustrated in Figs. 1 and 2 with the exception of the jaw structure itself, and consequently the various parts of the diaphragm chuck itself in Figs. 3 and 4 are indicated by the same numerals as in Figs. 1 and 2 and require no further explanation for their complete understanding.

In Figs. 3 and 4, the chuck is provided with three jaw assemblies, the same as in the previous case, and each jaw assembly comprises a jaw base and a jaw support or member adjustable thereon about the axis of the chuck. In this case, the jaw bases are each indicated at 102 and as having a flat rear face lying in flat contacting relationship with respect to the forward face of the diaphragm 20 and fixed thereto in the same manner as the jaw bases previously described are fixed to their corresponding diaphragm. In this case, each jaw base 102 is provided centrally of its radially inner and outer edges with a dovetailed section projection 104 which is curved about the axis of the chuck as a center, as brought out in Fig. 4. Each jaw support or member 106 has a flat axially inner face provided with a dovetailed groove 108 in which the corresponding dovetailed projection 104 is complementarily received. In this case, each jaw member 106 extends both axially and radially outwardly from its point of connection with its jaw base 102 and a similarly inclined slot 110 is extended outwardly from the radially and axially outer edge of the groove 108 so as to render the jaw member 106 somewhat flexible in a direction transverse thereto.

A screw 112 is projected centrally through each jaw member 106 in a direction transversely of the slot 110. The screw 112 is rotatably and slidably received in that portion of the jaw member radially outwardly of the slot 110 and radially inwardly of the slot 110 the screw is threadably received by the jaw member. As will be appreciated, by tightening down the screw 112, it acts to reduce the thickness of the slot 110 and the width of the groove 108 so as to cause the jaw member to be clamped to the projection 104 and to be urged into flat contacting relationship with respect to the axially outer face of the jaw base 102.

When the screw 112 is loosened, then the jaw member 106 may be shifted about the axis of the chuck on the projection 104 to enable the various jaw members to be circularly positioned to receive any gear capable of being mounted in the chuck regardless of the number of teeth on the gear.

As in the case of the first-described construction, the axially outer end portion of each jaw member 106 is provided with a bore 114 corresponding with the bore 82 of the first-described construction. A pin member 116 is axially slidably and rotatably received in the bore 114, the inner end of the pin member 116 in this case being wedge-shaped, as indicated at 118, instead of coned as in the first-described construction. This means that the end 118 will have line contact between the teeth of the gear being chucked instead of point contact, as in the first-described construction, and will also necessitate the pins 116 being rotated about their axes when changing the chuck from a condition in which it has been adjusted to receive a spur gear, in order to receive a helical gear, or vice versa.

Each pin 116 is backed up by an adjusting screw 120, corresponding to the screw 88 of the first-described construction, which may be locked in adjusted position by means of a set screw 122. A set screw 124 corresponding to the set screw 92 of the first-described construction is provided for locking the pin 116 in axially and rotatably adjusted position.

It will be noted that each of the jaw members 106 is provided with a stop face 126 on its axially outer face a short distance radially inwardly of the corresponding pin 116. The stop faces 126 lie in a common plane perpendicular to the axis of the chuck and through contact with the axially inner face of a gear being chucked insure the same location of the axially inner face of the gear during an operation on the gear in the chuck. The first described construction is provided with similar stop faces at the radially inner margins of the jaw members 76.

It will be appreciated that the construction illustrated in Figs. 3 and 4 will operate in substantially the same manner, with substantially the same benefits, as the construction first described.

Having thus described our invention, what we claim by Letters Patent is:

1. In a diaphragm chuck of the class wherein there is a diaphragm and means are provided for flexing the central portion of the diaphragm axially with respect to the rim thereof, the combination with said diaphragm of a plurality of jaw bases fixed thereto in angularly spaced relation with respect to each other about the center of said diaphragm, a jaw member mounted on each of said jaw bases, each of said jaw members being mounted for individual shiftable movement in an arcuate path around and concentric to said axis, and means cooperating between each said jaw member and its corresponding jaw base for locking said jaw member in shifted position.

2. In a diaphragm chuck of the class wherein there is a diaphragm and means are provided for flexing the central portion of the diaphragm axially with respect to the rim thereof, the combination with said diaphragm of a plurality of jaw bases fixed thereto in angularly spaced relation with respect to each other about the center of said diaphragm, a jaw member for each of said jaw bases, said jaw members and said jaw bases having cooperating tongues and grooves arcuately curved about and concentric to the axis of said chuck, said jaw members being individually and separately movable and said tongues and grooves serving to guide said jaw members during movement thereof on said jaw bases, and means for clamping said jaw members in adjusted position to said jaw bases.

3. In a diaphragm chuck of the class wherein there is a diaphragm and means are provided for flexing the central portion of the diaphragm axially with respect to the rim thereof, the combination with said diaphragm of a plurality of jaw bases fixed thereto in angularly spaced relation with respect to each other about the center of said diaphragm, each of said jaw bases having a plurality of groves therein arranged in a plane perpendicular to the axis of rotation of said chuck and curved about the axis of said chuck as a center, a jaw member cooperating with and individually adjustable in an arcuate path about and concentric to the axis of said chuck on each of said jaw bases, a tongue on each of said jaw members arranged in interfitting relationship with respect to at least one of said grooves in the corresponding of said jaw bases, and clamping means including means received in another of said grooves of each of said jaw bases cooperating between each said jaw member and its corresponding jaw base for locking said jaw member to said jaw bases in adjusted position thereon.

4. In a diaphragm chuck of the class wherein there is a diaphragm arranged to rotate about its axis and means are provided for flexing the central portion of said diaphragm axially with respect to the rim thereof, the combination with said diaphragm of a plurality of angularly spaced jaw bases fixed thereto, a jaw member mounted on each of said jaw bases for individual adjustment in a path struck about the axis of rotation of said chuck, means for locking each of said jaw members in circumferentially adjusted position, and radially directed means carried by each of said jaw members formed for engagement with the toothed surface of a gear.

5. In a diaphragm chuck of the class wherein there is a diaphragm arranged to rotate about its axis and means are provided for flexing the central portion of said diaphragm axially with respect to the rim thereof, the combination with said diaphragm of a plurality of angularly spaced jaw bases fixed thereto, a jaw member adjustably mounted on each of said jaw bases for individual adjustment in a path struck about the axis of rotation of said chuck, means for locking each of said jaw members in circumferentially adjusted position, a radially adjustable work-engaging member carried by each of said jaw members, and adjustable back-up member for each of said radially adjustable members, and means for locking said radially adjustable members and said back-up members in radially adjusted position on said jaw members.

6. In a diaphragm chuck of the class wherein there is a diaphragm to rotate about its axis and means are provided for flexing the central portion of said diaphragm axially with respect to the rim thereof, the combination with said diaphragm of a plurality of angularly spaced jaw bases fixed thereto, a jaw member adjustably mounted on each of said jaw bases for individual adjustment in a path struck about the axis of rotation of said chuck, means for locking each of said jaw members in circumferentially adjusted position, a pin member arranged with its axis radial to the axis of said chuck axially adjustably received by each of said jaw members, a back-up screw axially alinged with each of said pin members threadably received by each of said jaw members and arranged in axially abutting relationship with respect to each of said pin members, and means for locking said pin members and said back-up screws in axially adjusted position in said jaw members.

7. In a diaphragm chuck of the class wherein there is a diaphragm and means are provided for flexing the central portion of the diaphragm axially with respect to the rim thereof, the combination with said diaphragm of a plurality of jaw bases fixed thereto in angularly spaced relation with respect to each other about the center of said diaphragm, each of said jaw bases having a plurality of arcuate grooves therein arranged in a plane perpendicular to the axis of rotation of said chuck and concentric to the axis of said chuck, a jaw member cooperating with each of said jaw bases, a tongue on each of said jaw members arranged in interfitting relationship with respect to at least one of said grooves in the corresponding of said jaw bases, said jaw members being individually adjustable on said bases and about the axis of the chuck, a radially adjustable work-engaging member carried by each of said jaw members, means for locking said work-engaging members in radially adjusted position in said jaw members, and clamping means including means received in another of said grooves of each of said jaw bases cooperating between each said jaw member and its corresponding jaw base for locking said jaw member to said jaw base in adjusted position thereon.

8. In a diaphragm chuck of the class wherein there is a diaphragm and means are provided for flexing the central portion of the diaphragm axially with respect to the rim thereof, the combination with said diaphragm of a plurality of jaw bases fixed thereto in angularly spaced relation with respect to each other about the center of said diaphragm, each of said jaw bases having a plurality of arcuate grooves therein arranged in a plane perpendicular to the axis of rotation of said chuck and concentric to the axis of said chuck, a jaw member cooperating with each of said jaw bases, a tongue on each of said jaw members arranged in interfitting relationship with respect to at least one of said grooves in the corresponding of said jaw bases, said jaw members being individually adjustable on said bases and about the axis of the chuck, a pin member arranged with its axis radial to the axis of rotation of said chuck axially slidably received by each of said jaw members, one end of each of said pin members being formed for engagement between adjacent teeth of a gear, a back-up screw axially aligned with each of said pin members and threadably received by the corresponding of said jaw members in axially abutting relationship with respect to the corresponding of said pin members, means for locking said pin members and said back-up screws in axially adjusted position, and clamping means including means received in another of said grooves of each of said jaw bases cooperating between each said jaw member and its corresponding jaw base for locking said jaw member to said jaw bases in adjusted position thereon.

9. In a diaphragm chuck of the class wherein there is a diaphragm and means are provided for flexing the central portion of the diaphragm axially with respect to the rim thereof, the combination with said diaphragm of a plurality of jaw bases fixed thereto in angularly spaced relation with respect to each other about the center of said diaphragm, a dovetail projecting axially outwardly from and fixed with respect to each of said jaw bases, said dovetails being curved about the axis of said chuck as a center, a jaw member received on each of said jaw bases, each of said jaw members having a plane axially inner face in contact with the axially outer face of the corresponding jaw base and a dovetail groove therein complementarily receiving the corresponding of said dovetails therein, each of said jaw members being slotted in an axially outward direction from its dovetail groove whereby to render that portion thereof including said groove yieldable in a direction transversely of the length of said dovetail groove, means bridging said slots for contracting said jaw members transversely of said dovetail grooves, and radially adjustable gear-engaging elements carried by said jaw members.

10. In a chuck for gears and the like, a rotatable support, jaw bases carried by and concentric to the axis of said support, work-engaging jaws mounted on said bases for individual adjustment in arcuate paths about the axis of said support, and means for holding said jaws securely in selected adjusted positions on said bases.

11. In a chuck for gears and the like, a rotatable support, jaw bases carried by said support, work-engaging jaws mounted on said bases for individual adjustment radially of said support and also in arcuate paths about the axis of said support, and means for holding said jaws securely in selected adjusted positions on said bases.

GEORGE HOHWART.
ERNEST F. HOHWART.

REFERENCES CITED

The following references are of record in the file of this patent:

UNITED STATES PATENTS

| Number | Name | Date |
|---|---|---|
| 968,051 | Hanson | Aug. 23, 1910 |
| 1,058,237 | Heald | Apr. 8, 1913 |
| 1,372,726 | Sloan | Mar. 29, 1921 |
| 1,956,318 | Draper | Apr. 24, 1934 |
| 2,394,624 | Matchett | Feb. 12, 1946 |
| 2,403,599 | Hohwart et al. | July 9, 1946 |

FOREIGN PATENTS

| Number | Country | Date |
|---|---|---|
| 39,934 | France | Mar. 19, 1932 |
| 291,645 | Italy | of 1931 |